United States Patent
Radulescu et al.

(10) Patent No.: US 11,368,927 B2
(45) Date of Patent: Jun. 21, 2022

(54) RATE MATCHING AROUND SYNCHRONIZATION SIGNAL BLOCKS IN UNLICENSED SPECTRUM

(71) Applicant: QUALCOMM Incorporated, San Diego, CA (US)

(72) Inventors: Andrei Dragos Radulescu, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 16/949,762

(22) Filed: Nov. 13, 2020

(65) Prior Publication Data

US 2021/0153144 A1 May 20, 2021

Related U.S. Application Data

(60) Provisional application No. 62/937,211, filed on Nov. 18, 2019.

(51) Int. Cl.
*H04W 56/00* (2009.01)

(52) U.S. Cl.
CPC .................................. *H04W 56/00* (2013.01)

(58) Field of Classification Search
CPC . H04W 56/00; H04W 56/0015; H04B 7/0695
See application file for complete search history.

(56) References Cited

U.S. PATENT DOCUMENTS

| | | | | |
|---|---|---|---|---|
| 10,694,480 B2 * | 6/2020 | Nangia | ............... | H04W 56/001 |
| 10,812,210 B2 * | 10/2020 | Ly | ............... | H04B 7/0695 |
| 10,912,129 B2 * | 2/2021 | Zhang | ............... | H04L 5/0096 |
| 11,051,234 B2 * | 6/2021 | Sun | ............... | H04L 5/0053 |
| 11,122,497 B2 * | 9/2021 | Chen | ............... | H04W 56/001 |
| 11,133,971 B2 * | 9/2021 | Ko | ............... | H04L 5/0051 |
| 11,160,054 B2 * | 10/2021 | Kim | ............... | H04L 5/0094 |
| 2019/0081721 A1 * | 3/2019 | Ly | ............... | H04B 7/0695 |
| 2019/0150110 A1 * | 5/2019 | Ko | ............... | H04L 5/0053 |
| | | | | 370/350 |
| 2020/0154341 A1 * | 5/2020 | Sun | ............... | H04W 72/042 |

(Continued)

OTHER PUBLICATIONS

International Search Report and Written Opinion—PCT/US2020/070794—ISA/EPO—dated Feb. 25, 2021.

(Continued)

*Primary Examiner* — Ahmed Elallam
(74) *Attorney, Agent, or Firm* — Harrity & Harrity, LLP

(57) ABSTRACT

Various aspects of the present disclosure generally relate to wireless communication. In some aspects, a base station may transmit, and a user equipment (UE) may receive, a bitmap that includes a bit sequence to indicate a synchronization signal block (SSB) transmission pattern. The UE may perform rate matching around one or more candidate SSB positions in an initial portion of a window in which SSB transmission is expected, based at least in part on the bitmap, a first parameter indicating a quantity of initial candidate SSB positions in the window subject to rate (Continued)

matching, and a second parameter indicating a quantity of initial bits in the bit sequence that define the SSB transmission pattern. Numerous other aspects are provided.

30 Claims, 11 Drawing Sheets

(56) References Cited

U.S. PATENT DOCUMENTS

| | | | | |
|---|---|---|---|---|
| 2020/0154376 | A1* | 5/2020 | Ko | H04L 5/0044 |
| 2020/0305102 | A1* | 9/2020 | Jia | H04W 56/001 |
| 2020/0374837 | A1* | 11/2020 | Harada | H04W 72/005 |
| 2020/0383071 | A1* | 12/2020 | Nangia | H04W 76/27 |
| 2020/0396744 | A1* | 12/2020 | Xiong | H04W 72/0446 |
| 2021/0014804 | A1* | 1/2021 | Huang | H04W 72/046 |
| 2021/0235513 | A1* | 7/2021 | Kim | H04W 74/0891 |
| 2021/0314886 | A1* | 10/2021 | Ko | H04L 27/2613 |

OTHER PUBLICATIONS

NTT DOCOMO, et al., "Enhancements to Initial Access Procedure for NR-U," 3GPP Draft, 3GPP TSG RAN WG1 #96, R1-1902790, Enhancements to Initial Access Procedure for NR-U Final, 3rd Generation Partnership Project (3GPP), Mobile Competence Centre, 650, Route Des Lucioles, F-06921, Sophia-Antipolis Cedex, France, vol. RAN WG1. No. Athens., Greece, Feb. 25, 2019-Mar. 1, 2019, Feb. 15, 2019 (Feb. 15, 2019), XP051600485, pp. 1-10, Retrieved from the Internet: URL: http://www.3gpp.org/ftp/tsg%5Fran/WG1%5FRL1/TSGR1%5F96/Docs/R1%2D1902790%2Ezip [retrieved on Feb. 15, 2019] pp. 1-10.

NTT DOCOMO, et al., "Initial Access Signals and Channels for NR-U," 3GPP Draft, 3GPP TSG RAN WG1 #98, R1-1909174, Initial Access Signals and Channels for NR-U Final, 3rd Generation Partnership Project (3GPP), Mobile Competence Centre, 650, Route Des Lucioles, F-06921, Sophia-Antipolis Cedex, France, vol. RAN WG1, No. Prague, CZ, Aug. 26, 2019-Aug. 30, 2019, Aug. 16, 2019 (Aug. 16, 2019), XP051765779, pp. 1-13, Retrieved from the Internet: URL: http://www.3gpp.org/ftp/tsg_ran/WG1_RL1/TSGR1_98/Docs/R1-1909174.zip [retrieved on Aug. 16, 2019] pp. 1-13.

OPPO: "Enhancements to Initial Access Procedure for NR-U," 3GPP Draft, 3GPP TSG RAN WG1 #99, R1-1912507, 3rd Generation Partnership Project (3GPP), Mobile Competence Centre, 650, Route Des Lucioles, F-06921, Sophia-Antipolis Cedex, France, vol. RAN WG1. No. Reno, USA; Nov. 18, 2019-Nov. 22, 2019, Nov. 9, 2019 (Nov. 9, 2019), XP051823447, 8 pages, Retrieved from the Internet: URL: https://ftp.3gpp.org/tsg_ran/WG1_RL1/TSGR1_99/Docs/R1-1912507.zip R1-1912507.docx [retrieved on Nov. 9, 2019] pp. 1-8.

* cited by examiner

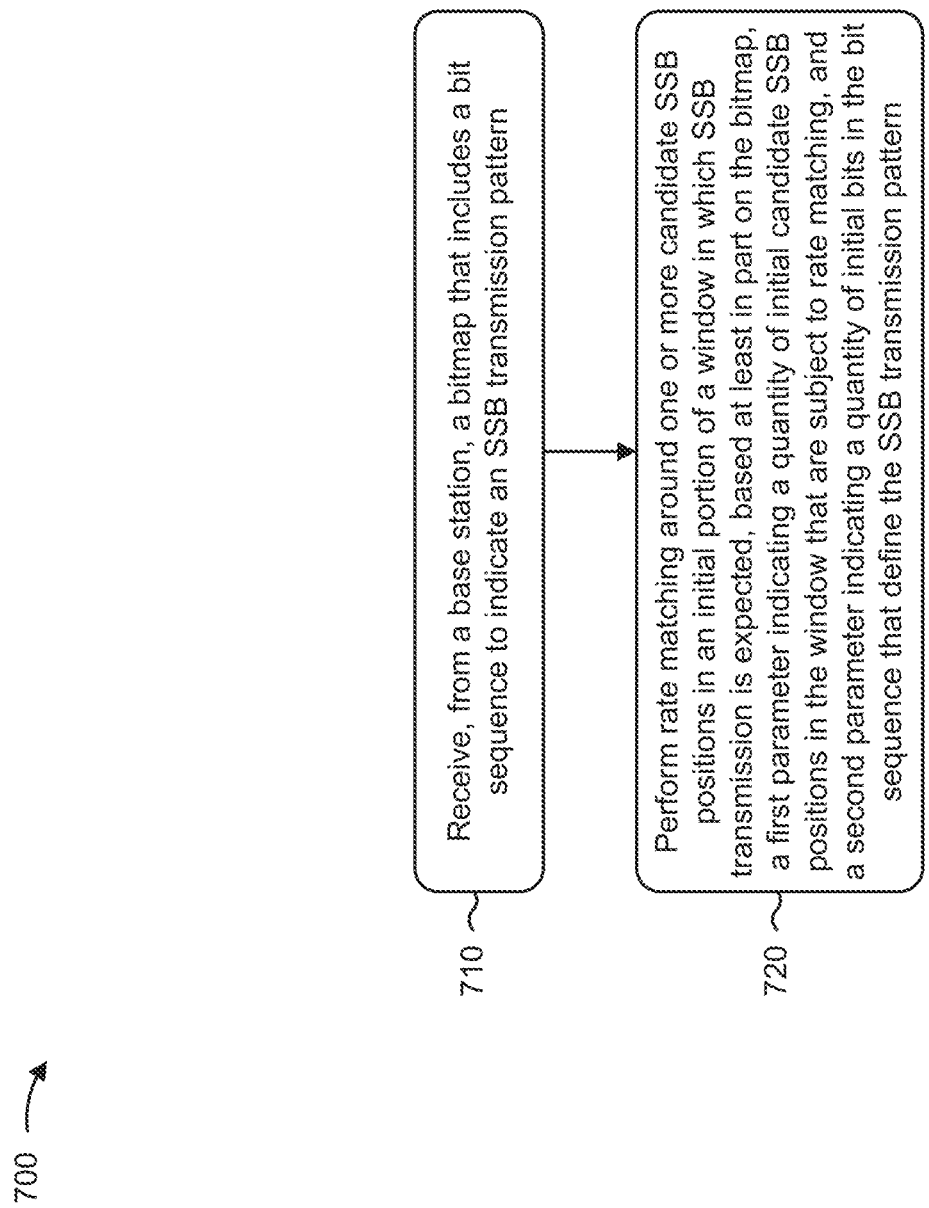

RATE MATCHING AROUND SYNCHRONIZATION SIGNAL BLOCKS IN UNLICENSED SPECTRUM

CROSS-REFERENCE TO RELATED APPLICATION

This patent application claims priority to U.S. Provisional Patent Application No. 62/937,211, filed on Nov. 18, 2019, entitled "RATE MATCHING AROUND SYNCHRONIZATION SIGNAL BLOCKS IN UNLICENSED SPECTRUM," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for rate matching around synchronization signal blocks (SSBs) in unlicensed spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: receiving, from a base station, a bitmap that includes a bit sequence to indicate a synchronization signal block (SSB) transmission pattern; and performing rate matching around one or more candidate SSB positions in an initial portion of a window in which SSB transmission is expected, based at least in part on the bitmap, a first parameter indicating a quantity of initial candidate SSB positions in the window that are subject to rate matching, and a second parameter indicating a quantity of initial bits in the bit sequence that define the SSB transmission pattern.

In some aspects, a method of wireless communication, performed by a base station, may include: transmitting, to a UE, a bitmap that includes a bit sequence to indicate an SSB transmission pattern; and scheduling transmission of one or more SSBs in one or more candidate SSB positions in an initial portion of a window in which SSB transmission is expected by the UE based at least in part on the SSB transmission pattern, wherein the UE performs rate matching around the one or more candidate SSB positions in the initial portion of the window, based at least in part on the bitmap, a first parameter indicating a quantity of initial candidate SSB positions in the window that are subject to rate matching, and a second parameter indicating a quantity of initial bits in the bit sequence that define the SSB transmission pattern.

In some aspects, a UE for wireless communication may include a memory and one or more processors operatively coupled to the memory. The memory and the one or more processors may be configured to: receive, from a base station, a bitmap that includes a bit sequence to indicate an SSB transmission pattern; and perform rate matching around one or more candidate SSB positions in an initial portion of a window in which SSB transmission is expected, based at least in part on the bitmap, a first parameter indicating a quantity of initial candidate SSB positions in the window that are subject to rate matching, and a second parameter indicating a quantity of initial bits in the bit sequence that define the SSB transmission pattern.

In some aspects, a base station for wireless communication may include a memory and one or more processors operatively coupled to the memory. The memory and the one or more processors may be configured to: transmit, to a UE, a bitmap that includes a bit sequence to indicate an SSB transmission pattern; and schedule transmission of one or more SSBs in one or more candidate SSB positions in an initial portion of a window in which SSB transmission is expected by the UE based at least in part on the SSB transmission pattern, wherein the UE performs rate matching around the one or more candidate SSB positions in the initial portion of the window, based at least in part on the bitmap, a first parameter indicating a quantity of initial candidate SSB positions in the window that are subject to rate matching, and a second parameter indicating a quantity of initial bits in the bit sequence that define the SSB transmission pattern In some aspects, a non-transitory computer-readable medium may store one or more instructions for wireless communication. The one or more instructions, when executed by one or more processors of a UE, may cause the one or more processors to: receive, from a base station, a bitmap that includes a bit sequence to indicate an SSB transmission pattern; and perform rate matching around one or more candidate SSB positions in an initial portion of a window in which SSB transmission is expected, based at least in part on the bitmap, a first parameter indicating a quantity of initial candidate SSB positions in the window that are subject to rate matching, and a second parameter indicating a quantity of initial bits in the bit sequence that define the SSB transmission pattern.

In some aspects, a non-transitory computer-readable medium may store one or more instructions for wireless communication. The one or more instructions, when executed by one or more processors of a base station, may cause the one or more processors to: transmit, to a UE, a bitmap that includes a bit sequence to indicate an SSB transmission pattern; and schedule transmission of one or more SSBs in one or more candidate SSB positions in an initial portion of a window in which SSB transmission is expected by the UE based at least in part on the SSB transmission pattern, wherein the UE performs rate matching around the one or more candidate SSB positions in the initial portion of the window, based at least in part on the bitmap, a first parameter indicating a quantity of initial candidate SSB positions in the window that are subject to rate matching, and a second parameter indicating a quantity of initial bits in the bit sequence that define the SSB transmission pattern.

In some aspects, an apparatus for wireless communication may include: means for receiving, from a base station, a bitmap that includes a bit sequence to indicate an SSB transmission pattern; and means for performing rate matching around one or more candidate SSB positions in an initial portion of a window in which SSB transmission is expected, based at least in part on the bitmap, a first parameter indicating a quantity of initial candidate SSB positions in the window that are subject to rate matching, and a second parameter indicating a quantity of initial bits in the bit sequence that define the SSB transmission pattern.

In some aspects, an apparatus for wireless communication may include: means for transmitting, to a UE, a bitmap that includes a bit sequence to indicate an SSB transmission pattern; and means for scheduling transmission of one or more SSBs in one or more candidate SSB positions in an initial portion of a window in which SSB transmission is expected by the UE based at least in part on the SSB transmission pattern, wherein the UE performs rate matching around the one or more candidate SSB positions in the initial portion of the window, based at least in part on the bitmap, a first parameter indicating a quantity of initial candidate SSB positions in the window that are subject to rate matching, and a second parameter indicating a quantity of initial bits in the bit sequence that define the SSB transmission pattern.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
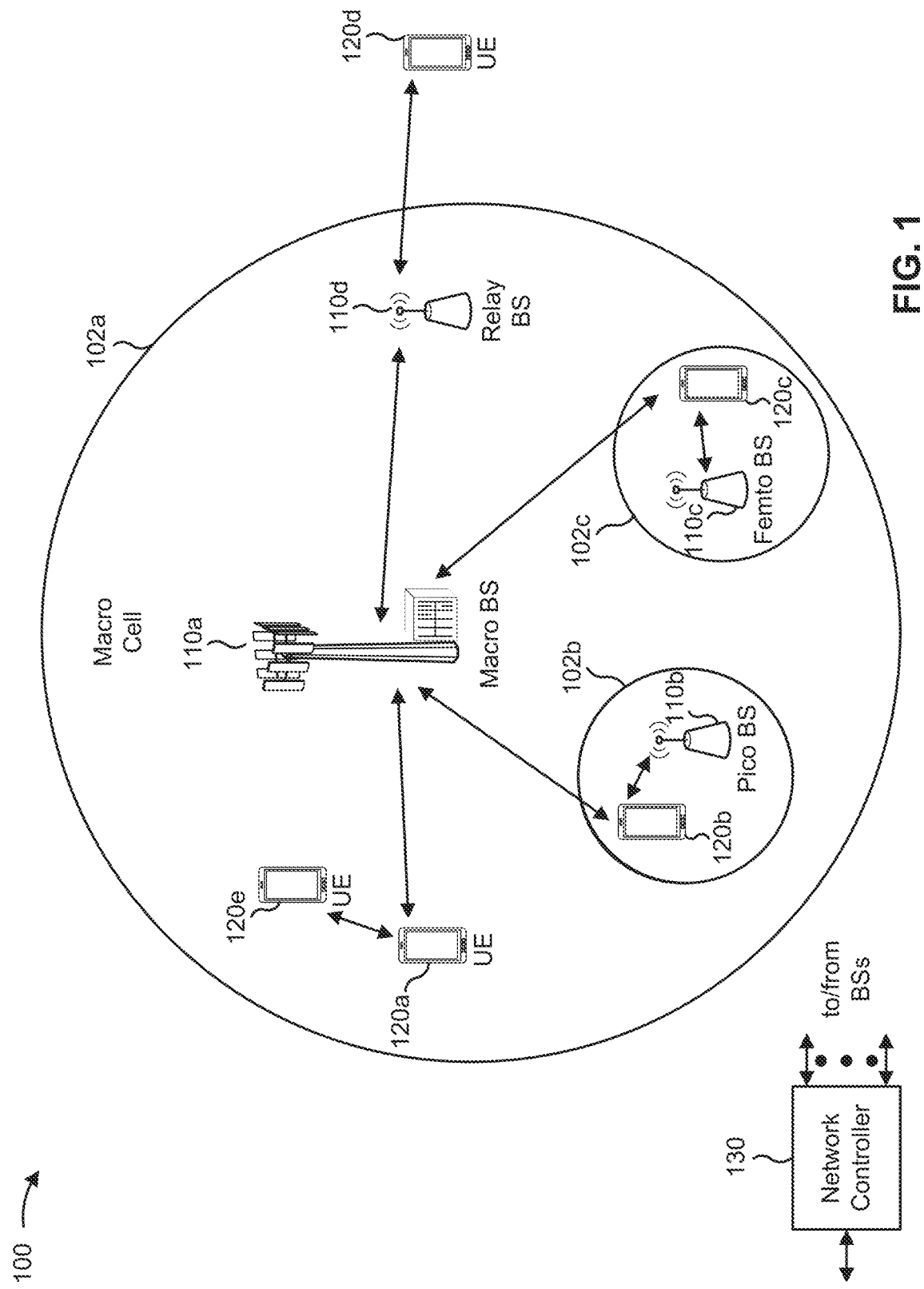
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things)

devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE 120 and a base station 110 may operate in an unlicensed radio frequency (RF) spectrum band using one or more radio access technologies, such as a wireless local area network (WLAN) radio access technology (e.g., Wi-Fi), an LTE radio access technology, a 5G radio access technology, and/or the like. An unlicensed RF spectrum band may refer to an RF spectrum band that is open for shared use by any device that complies with regulatory agency rules for communicating via the RF spectrum band. In contrast with most licensed RF spectrum band usage, users of unlicensed RF spectrum bands do not typically have regulatory protection against radio interference from devices of other users. For example, devices that use the unlicensed RF spectrum band must typically accept any radio interference caused by other devices that use the unlicensed RF spectrum band. Because the unlicensed RF spectrum band may be shared by devices operating under different protocols (e.g., different RATs), transmitting devices may contend for access to the unlicensed RF spectrum band (e.g., using a listen-before-talk (LBT) procedure and/or the like).

In some aspects, the unlicensed RF spectrum band may include one or more radio frequencies (e.g., one or more RF spectrum bands) included in the radio spectrum (e.g., the portion of the electromagnetic spectrum corresponding to radio frequencies, or frequencies lower than approximately 300 gigahertz (GHz)). In some aspects, the unlicensed RF spectrum band may include one or more RF spectrum bands that are open for shared use by any device that complies with regulatory agency rules (e.g., associated with a particular country) for communicating via the one or more RF spectrum bands. In some aspects, the unlicensed RF spectrum band may include one or more radio frequencies in the 2.4 GHz band. For example, the unlicensed RF spectrum band may include one or more radio frequencies between approximately 2.4 GHz and 2.48 GHz. Additionally, or alternatively, the unlicensed RF spectrum band may include one or more radio frequencies in the 5 GHz band. For example, the unlicensed RF spectrum band may include one or more radio frequencies between approximately 5.15 GHz and approximately 5.825 GHz.

The unlicensed RF spectrum band may be divided into channels via which RF communications may be transmitted. In some aspects, the unlicensed RF spectrum band may include one or more channels of approximately 1.4 MHz bandwidth (e.g., up to 59 channels at 1.4 MHz bandwidth in the 2.4 GHz band). Additionally, or alternatively, the unlicensed RF spectrum band may include one or more channels of approximately 20 MHz bandwidth. Wireless devices may communicate via a channel included in the unlicensed RF spectrum band. For example, a wireless device may communicate via an RF channel using a WLAN radio access technology, an LTE radio access technology, a 5G radio access technology, and/or the like.

In some aspects, a transmitting device (e.g., a base station 110, a UE 120, and/or the like) may have to contend for access to the unlicensed RF spectrum band before sending a transmission via the unlicensed RF spectrum band. For example, prior to gaining access to, and transmitting over, an unlicensed RF spectrum band, a transmitting device may have to successfully perform an LBT procedure to contend for access to the unlicensed radio frequency spectrum band. The LBT procedure may generally include performing a clear channel assessment (CCA) procedure to determine whether a channel of the unlicensed RF spectrum band is available. In particular, the CCA procedure may include detecting an energy level on the channel of the unlicensed RF spectrum band and determining whether the energy level satisfies (e.g., is less than or equal to) a threshold. When the energy level satisfies the threshold, the CCA procedure is deemed to be successful and contention to access the channel of the unlicensed RF spectrum band may be successful. When the energy level does not satisfy the threshold, the CCA procedure is unsuccessful and contention to access the channel of the unlicensed RF spectrum band may be unsuccessful, and the CCA procedure may be performed for the channel again at a later time.

As indicated above, FIG. 1 is provided as an example. Other examples may differ from what is described with regard to FIG. 1.

Figure 2:
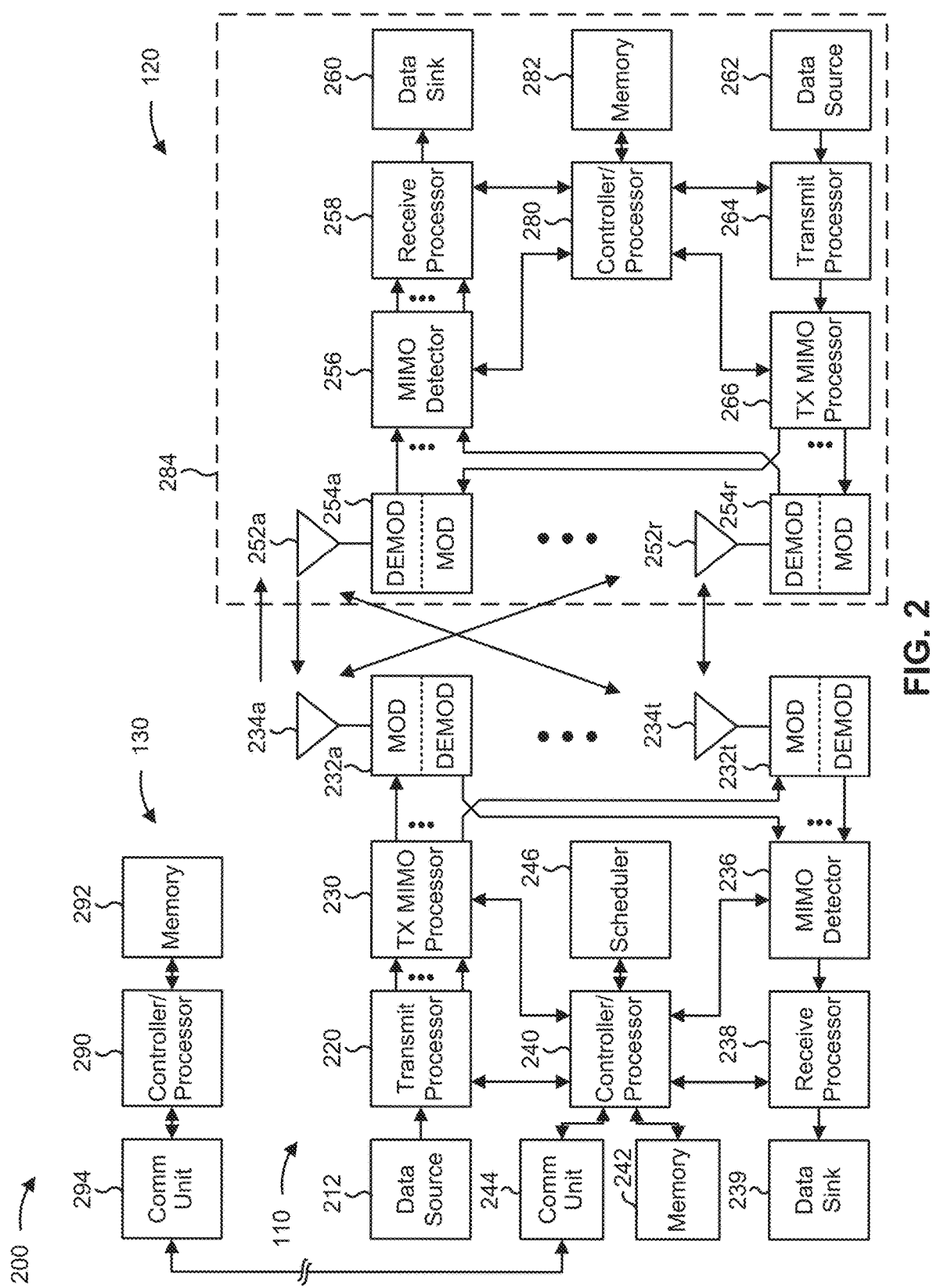
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with rate matching around synchronization signal blocks (SSBs) in unlicensed spectrum, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like.

In some aspects, UE 120 may include means for receiving, from base station 110, a bitmap that includes a bit sequence to indicate an SSB transmission pattern, means for performing rate matching around one or more candidate SSB positions in an initial portion of a window in which SSB transmission is expected, based at least in part on the bitmap, a first parameter indicating a quantity of initial candidate SSB positions in the window that are subject to rate matching, and a second parameter indicating a quantity of initial bits in the bit sequence that define the SSB transmission pattern, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, a bitmap that includes a bit sequence to indicate an SSB transmission pattern, means for scheduling transmission of one or more SSBs in one or more candidate SSB positions in an initial portion of a window in which SSB transmission is expected by the UE based at least in part on the SSB transmission pattern, wherein the UE performs rate matching around the one or more candidate SSB positions in the initial portion of the window, based at least in part on the bitmap, a first parameter indicating a quantity of initial candidate SSB positions in the window that are subject to rate matching, and a second parameter indicating a quantity of initial bits in the bit sequence that define the SSB transmission pattern, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
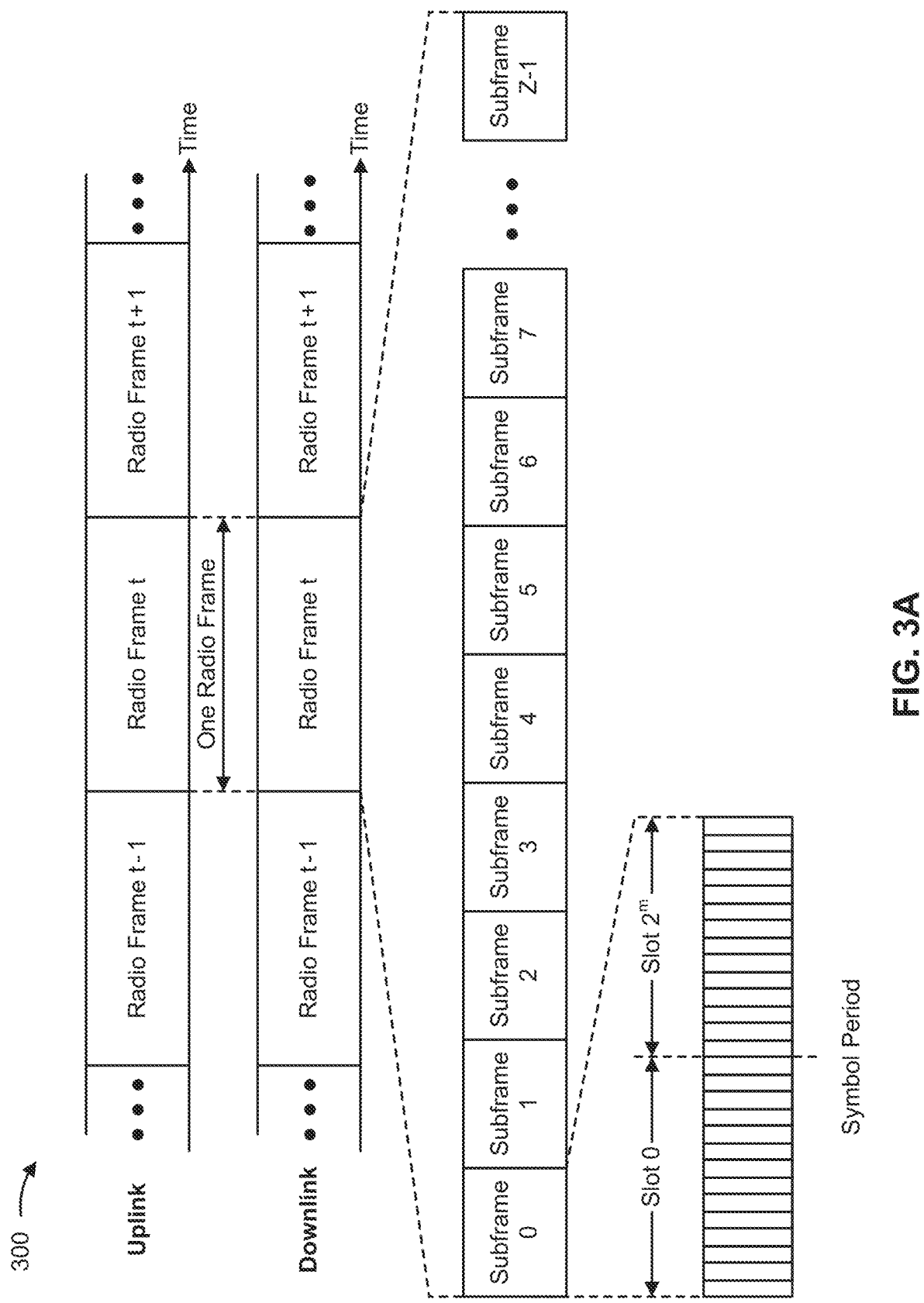
FIG. 3A is a diagram illustrating an example frame structure in a wireless network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SSBs), as described below in connection with FIG. 3B.

Figure 3B:
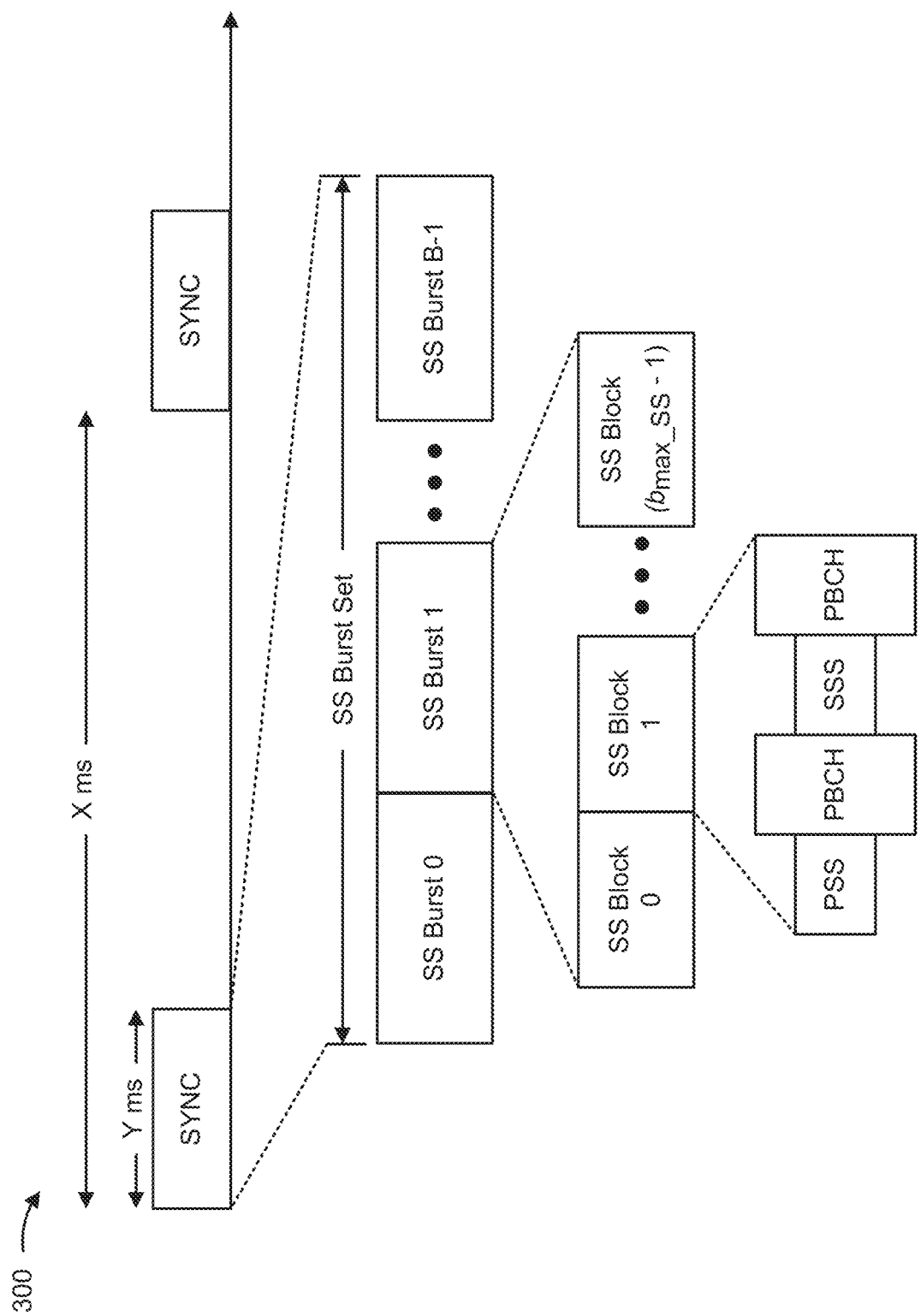
FIG. 3B is a diagram illustrating an example synchronization communication hierarchy in a wireless network, in accordance with various aspects of the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that may carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
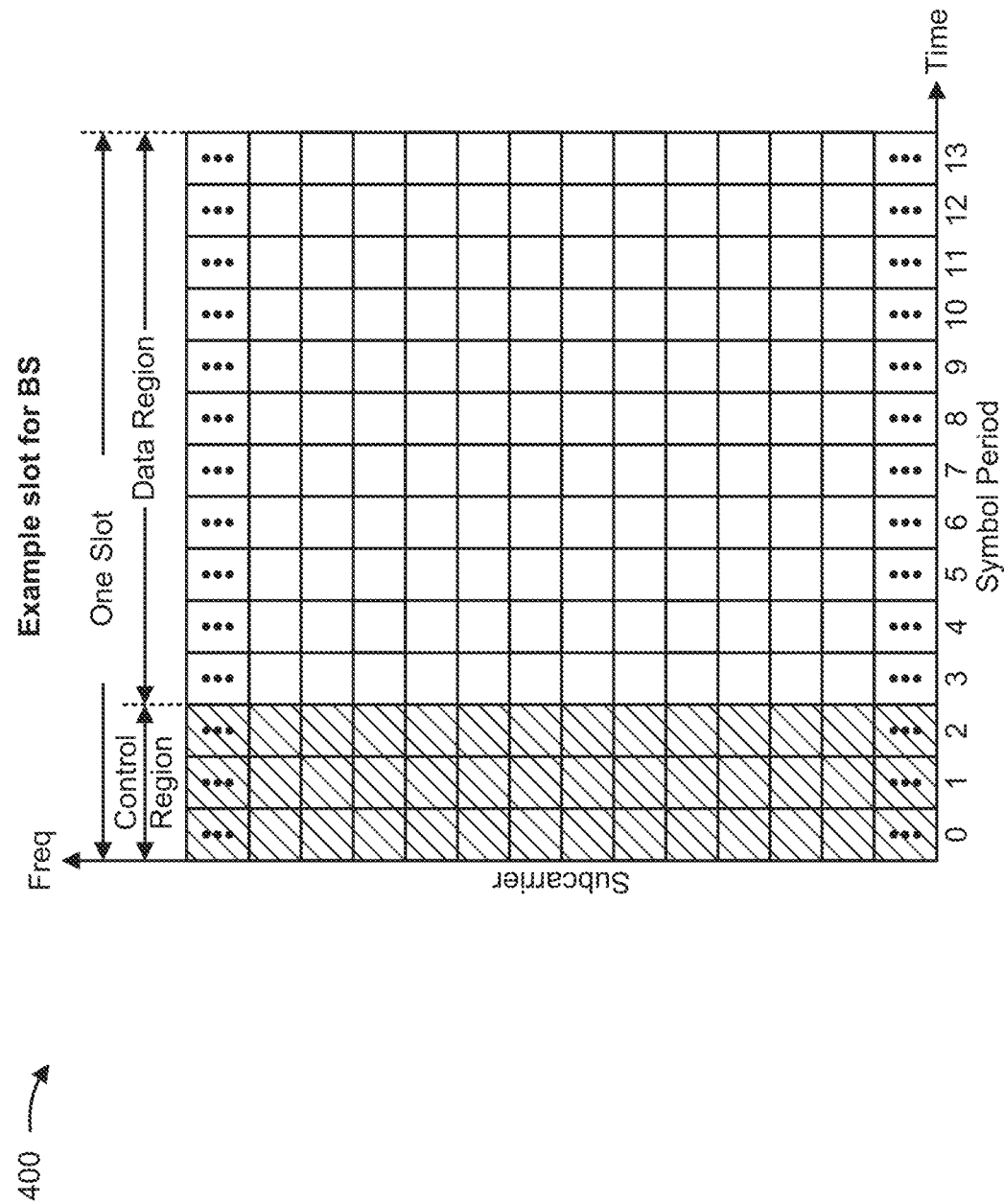
FIG. 4 is a diagram illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, Q . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, mission critical targeting ultra reliable low latency communications (URLLC) service, NR in unlicensed spectrum (NR-U), and/or the like.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5A:
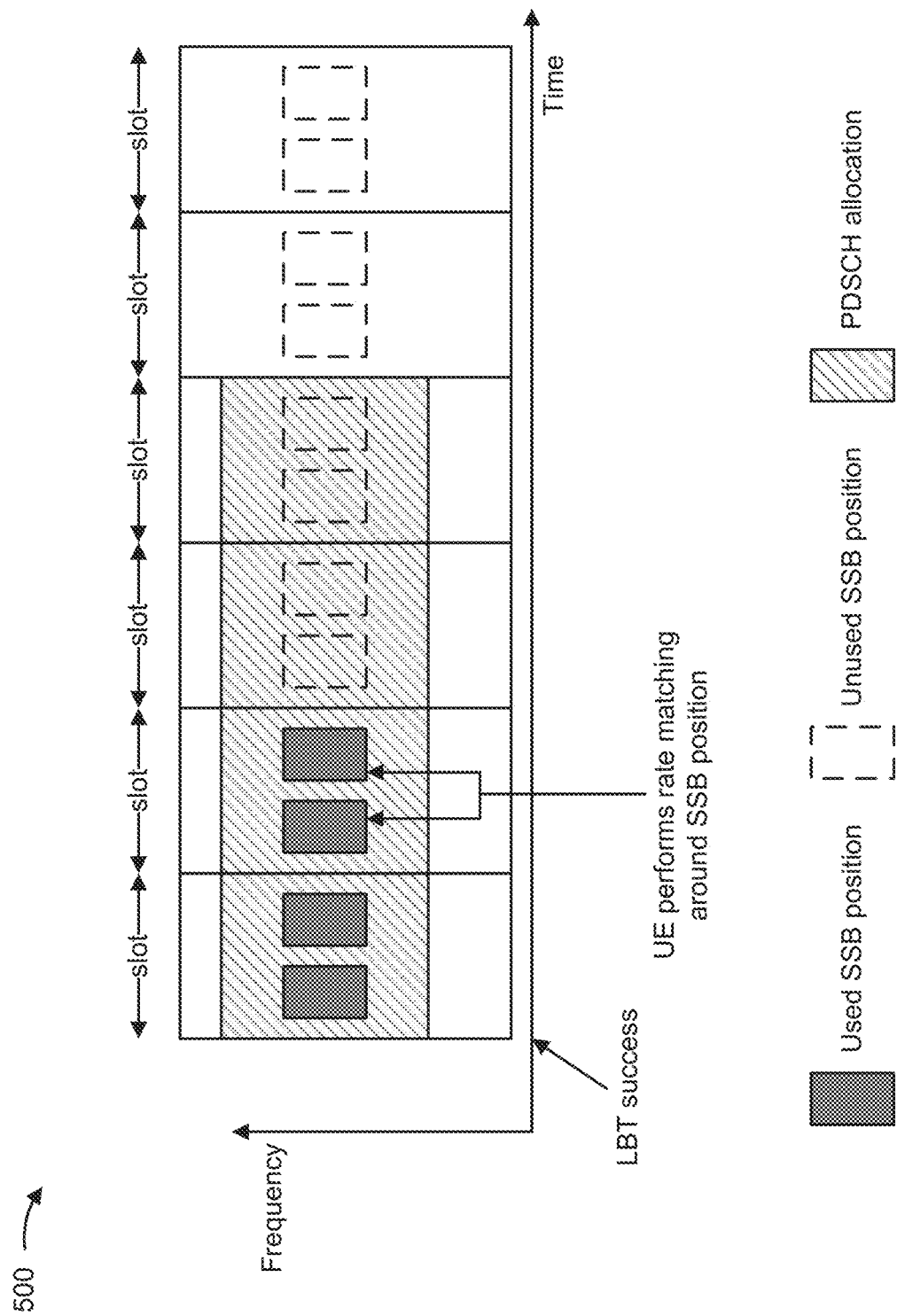
FIGS. 5A-5B are diagrams illustrating examples of synchronization signal block (SSB) transmission in unlicensed spectrum, in accordance with various aspects of the present disclosure.
Figure 5B:
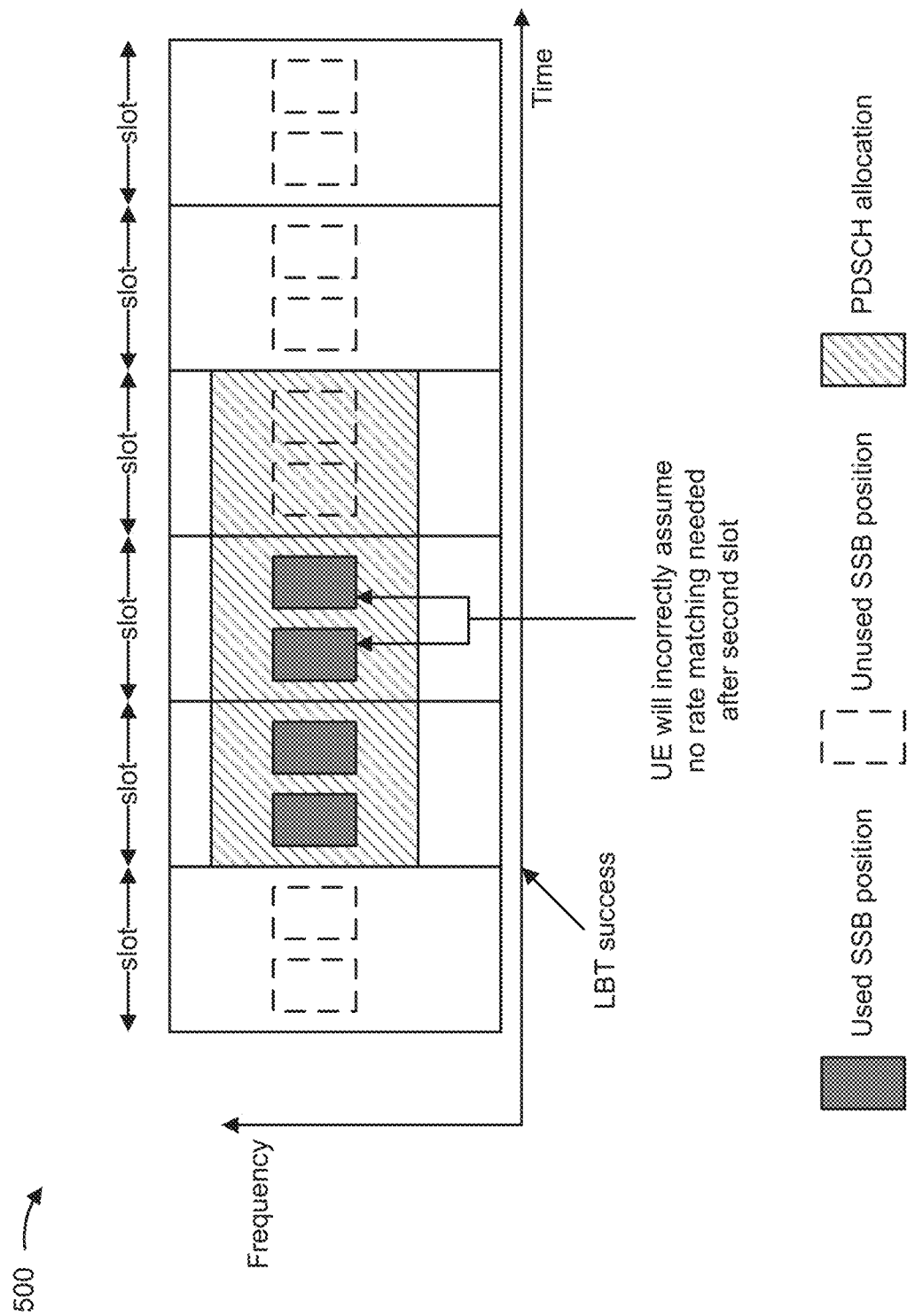

FIGS. 5A-5B are diagrams illustrating examples 500 of synchronization signal block (SSB) transmission in unlicensed spectrum, in accordance with various aspects of the present disclosure.

In licensed spectrum, SSBs are typically transmitted in fixed locations (e.g., resource elements that are fixed with respect to time and frequency). For unlicensed spectrum, however, all communication including SSB transmission is subject to medium access (e.g., listen-before-talk (LBT)) succeeding first. Accordingly, in unlicensed spectrum, SSB transmissions by a base station may potentially be shifted (e.g., delayed in time) depending on when the base station acquires medium access. The UE typically expects the base station to transmit SSBs as early as possible within a particular window (e.g., a discovery reference signal (DRS) window, an SSB measurement timing configuration (SMTC) window, and/or the like) that includes up to 2 SSB positions (e.g., occasions when an SSB can be transmitted) per slot. In licensed spectrum (e.g., 2-7 GHz), a base station may use up to 8 beams to transmit or broadcast SSBs having up to 8 different SSB indices. In unlicensed spectrum, although the base station can still transmit SSBs using up to 8 beams, the positions in which SSBs can be broadcasted or otherwise transmitted are larger (e.g., because the base station may be unable to transmit SSBs at earlier positions within the window if the base station does not acquire medium access prior to the earliest position(s) in the window). For example, in unlicensed spectrum, a window in which a UE may expect SSB transmissions can have a length up to 5 ms, which may encompass up to 10 candidate positions for SSB transmissions when a cell associated with the base station uses a 15 kHz subcarrier spacing, up to 20 candidate positions for SSB transmissions when the cell uses a 30 kHz subcarrier spacing, and/or the like.

Accordingly, because SSB transmission in unlicensed spectrum is subject to LBT success, transmission of any particular SSB index in unlicensed spectrum is generally non-deterministic due to uncertainty regarding when the base station will acquire medium access. In particular, a cell may generally be configured to transmit up to Q beams in the window for SSB transmission after LBT-based medium acquisition, where Q can have a value of 1, 2, 4, or 8. For example, FIG. 5A illustrates a scenario in which a cell is configured to transmit 4 SSB beams and LBT success occurs at the start of (or prior to) the window in which the UE may expect SSB transmissions (e.g., a DRS window, an SMTC window, and/or the like). In this case, where the base station has acquired medium access before and/or when the SSB transmission window starts, the base station may transmit the 4 SSB beams in SSB index 0 through SSB index Q−1 (e.g., SSB index 3 in the case of Q=4). In contrast, FIG. 5B illustrates a scenario in which LBT success occurs after the window in which the UE may expect SSB transmissions has already started. For example, in FIG. 5B, LBT success occurs just prior to slot index 1 (i.e., the second slot) of the window, whereby the base station can start SSB transmission only with the third SSB position (e.g., SSB index 2), and the base station may continue to transmit up to the sixth SSB position (e.g., SSB index 5). More generally, if the base station is configured to transmit Q beams in the window and LBT success occurs just prior to slot N of the window, the base station can start SSB transmission only with SSB index 2N and is likely to then continue to transmit up to SSB index Q+(2N−1). In general, the base station could also gain access the medium in the middle of a slot, in which case the first candidate SSB position used to transmit an SSB may have an odd numbered index.

Furthermore, another issue to be addressed when communicating in unlicensed spectrum relates to rate matching around SSB positions. For example, in licensed spectrum, a UE may generally rate match around SSB positions for certain physical downlink shared channels (PDSCHs), such as PDSCHs that do not include remaining minimum system information (RMSI). When rate matching around an SSB position, the UE may treat resource blocks (RBs) or resource elements (REs) of the SSB position as unavailable for PDSCH transmission. For example, the UE may receive a configuration message, such as a burst information message (e.g., an 'ssb-PositionsInBurst' message), which may be a bitmap or bit sequence to identify which SSB positions the base station is to use for an SSB transmission. In some cases, the UE may receive the burst information message before a PDSCH with RMSI is transmitted, and a scheduler may schedule the RMSI PDSCH to avoid an overlap with an SSB, thereby obviating a need for the UE to rate match around the SSB to receive the RMSI. Additionally, or alternatively, because RE location(s) used for SSB transmission are fixed in licensed spectrum, the base station can predeclare SSB transmission locations in radio resource control (RRC) signaling to inform every UE about the RE location(s) that will be used for SSB transmission. Accordingly, when the base station allocates around the SSBs, the UE knows exactly which RE location(s) to rate match around.

However, in unlicensed spectrum, some SSB positions indicated by a burst information message may not include an SSB transmission. For example, to ensure reliability when performing a contention-based access procedure (e.g., an LBT procedure), a base station may allocate multiple SSB positions for transmission of the same SSB beam. In this case, the base station may select a single SSB position for transmission of the SSB beam based on an outcome of the contention-based access procedure. However, the UE may lack information identifying whether an SSB position is selected for the transmission of the SSB beam. For example, the base station cannot state ahead of time which candidate position(s) will and/or will not be used for SSB transmissions because that decision is made dynamically depending on whether and/or when medium access is acquired. In this case, the UE may perform blind rate matching around SSB positions without information regarding whether the SSB positions are being used or are not being used. Although rate matching may work correctly if the UE assumes that the base station will transmit SSBs in every candidate position, in some cases the UE may rate match around SSB candidate positions that are not used (e.g., if the base station does not transmit SSBs in such candidate positions), which results in poor radio resource utilization efficiency, wasted capacity, and/or the like.

For example, referring again to FIG. 5A, in cases where the UE performs blind rate matching around all candidate SSB positions in the window, the UE may correctly perform rate matching around the first four SSB positions where SSBs are actually transmitted. However, there may be an additional sixteen candidate SSB positions in which SSBs are not transmitted in the case of a 30 kHz subcarrier spacing, an additional six candidate SSB positions in which SSBs are not transmitted in the case of a 15 kHz subcarrier spacing, and/or the like. Accordingly, poor radio resource utilization efficiency, wasted capacity, and/or the like may occur if the UE continues to perform blind rate matching for the candidate SSB positions in the remainder of the window. One possible approach to mitigate this wasted capacity may be to have the UE only perform rate matching for the first Q positions in the window based on the assumption that the base station will transmit SSBs as early as possible within the window. For example, where the base station is configured to transmit four SSB beams, the UE may perform rate matching around the first four candidate SSB positions in the window and then cease to perform rate matching for the remainder of the window. However, in cases where LBT success does not occur until after the window has started, the UE may incorrectly assume that no rate matching is needed during candidate SSB positions that are actually used. For example, in FIG. 5B, LBT success occurs after the window has started and just prior to the second slot in the window. In this case, the base station will transmit four SSB beams in SSB indexes 2, 3, 4, and 5, and the UE will incorrectly assume that no rate matching is needed in SSB indexes 4 and 5.

Some aspects described herein relate to techniques and apparatuses to perform rate matching around SSBs in unlicensed spectrum. For example, a base station may transmit, and a UE may receive, a bitmap that includes a bit sequence to indicate an SSB transmission pattern. For example, each bit in the bitmap that is set to one (1) may correspond to a candidate SSB position in which an SSB is to be transmitted, and each bit in the bitmap that is set to zero (0) may correspond to a candidate SSB position in which an SSB is not to be transmitted. In some aspects, the UE may be configured to interpret the bitmap according to a first parameter, $Q_p$, which may indicate a quantity of initial candidate SSB positions in the window that are subject to rate matching, and a second parameter, $Q_m$, which may indicate a quantity of initial bits in the bit sequence that define the SSB transmission pattern. Accordingly, the UE may perform rate matching for the first $Q_p$ positions in the window (e.g., SSB indexes 0 through $Q_p-1$), subject to a bit in the bitmap at a position $SSB_{index}$ mod $Q_m$ being set to 1. For example, if $Q_p$ equals 8, $Q_m$ equals 4, and the first 4 bits in the bitmap are set to '0101,' the UE may perform rate matching for SSB candidate positions corresponding to SSB indexes 1, 3, 5, and 7. Furthermore, when SSBs are transmitted in SSB candidate positions with an SSB index greater than or equal to $Q_p$, the base station may handle an allocation to avoid SSB collisions in the impacted symbols, or the base station may indicate that the SSB candidate positions with an SSB index greater than or equal to $Q_p$ are rate matchable regions and provide downlink control information to indicate when the UE is to perform rate matching for the rate matchable regions.

As indicated above, FIGS. 5A-5B are provided as an example. Other examples may differ from what is described with respect to FIGS. 5A-5B.

Figure 6A:
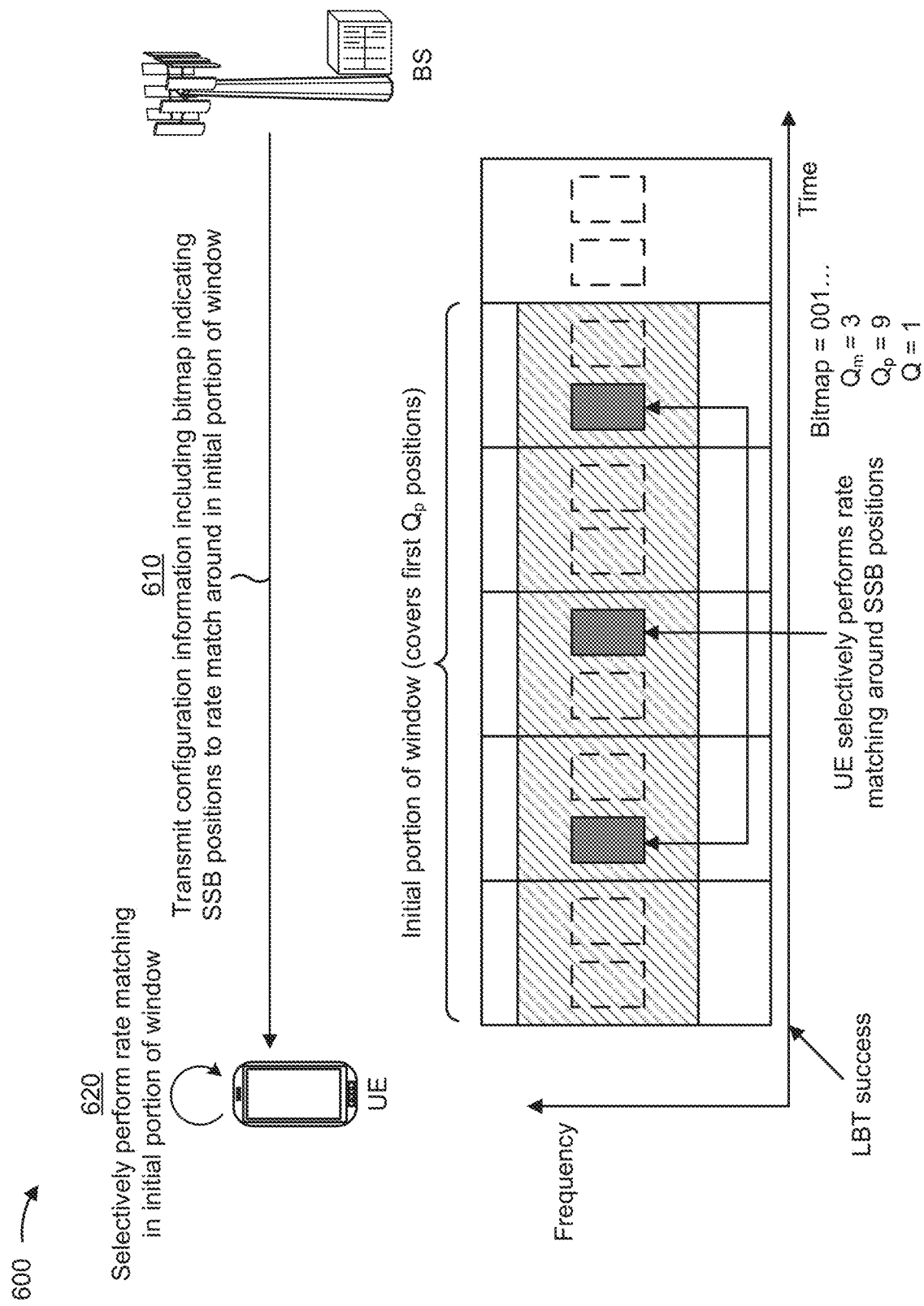
FIGS. 6A-6B are diagrams illustrating examples of rate matching around SSBs in unlicensed spectrum, in accordance with various aspects of the present disclosure.
Figure 6B:
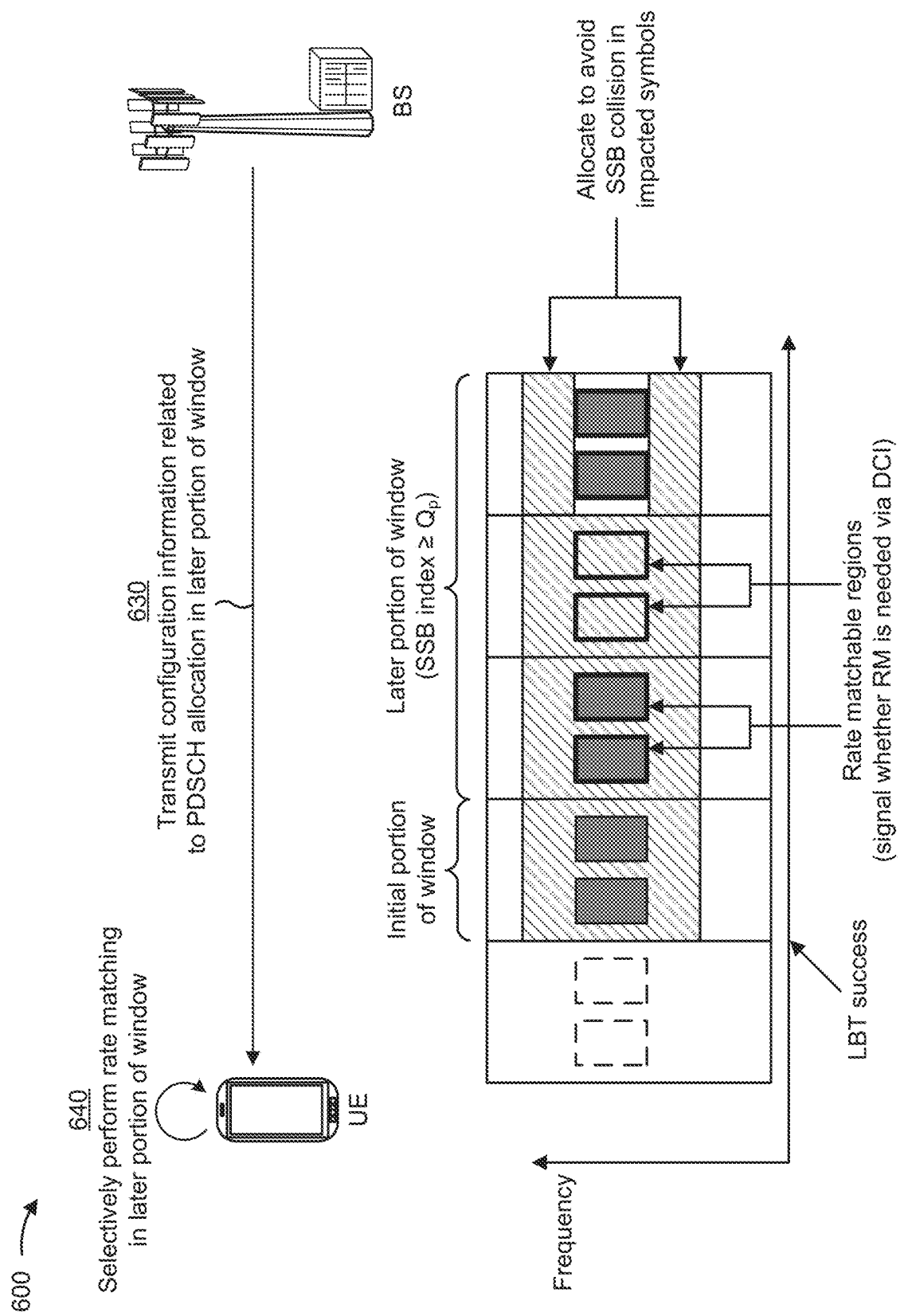

FIGS. 6A-6B are diagrams illustrating examples 600 of rate matching around SSBs in unlicensed spectrum, in accordance with various aspects of the present disclosure. As shown in FIGS. 6A-6B, examples 600 include a UE and a base station communicating over an unlicensed spectrum.

As shown in FIG. 6A, and by reference number 610, the base station may transmit, and the UE may receive, configuration information that includes a bitmap indicating one or more candidate SSB positions in which the UE is to perform rate matching in an initial portion of a window in which the UE expects SSB transmissions. For example, in some aspects, the bitmap may include an RRC parameter (e.g., ssb-PositionsInBurst) that includes a bit sequence (or bit string) in which a parameter, $Q_m$, indicates an initial quantity of bits that defines an SSB transmission pattern. In particular, in some aspects, the first $Q_m$ bits in the bit sequence may define the SSB transmission pattern, and the SSB transmission pattern indicated in the first $Q_m$ bits may then be repeated over the first $Q_p$ candidate SSB positions in the window. For example, in FIG. 6A, $Q_m$ equals 3 and $Q_p$ equals 9. Accordingly, because $Q_m$ equals 3, the first 3 bits in the bitmap define the SSB transmission pattern, and the SSB transmission pattern repeats three times over the first 9 candidate SSB positions because $Q_p$ equals 9. In some aspects, the parameters $Q_p$ and $Q_m$ may be included in the configuration information transmitted from the base station to the UE. Additionally, or alternatively, in some aspects, the parameters $Q_p$ and $Q_m$ may be preconfigured at the UE, defined with respect to another parameter, and/or the like.

For example, in some aspects, the configuration information transmitted by the base station and received by the UE may include a value for a parameter, Q, which may generally have a value of 1, 2, 4, or 8. For example, in some aspects, the UE may acquire the value for Q from a cell broadcast (e.g., a PBCH), from dedicated signaling when the UE is in a connected state, and/or the like. In general, the base station may be configured to transmit a total of up to Q beams in the window in which the UE expects SSB transmissions, and the value of Q may indicate quasi co-location (QCL) relationships among the beams to be used by the base station to transmit SSBs during the window. For example, the UE may assume that all SSB beams transmitted by the base station are quasi co-located (QCLed) when Q=1, may assume that beams that are four SSBs apart are QCLed when Q=4, and/or the like. Accordingly, in cases where $Index_{SSB-A}$ mod $Q = Index_{SSB-B}$ mod Q, the beams used to transmit SSBs in $Index_{SSB-A}$ and $Index_{SSB-B}$ are QCLed with respect to each other.

Accordingly, in some aspects, $Q_p$ may be configured to be equal to Q, in which case $Q_p$ is equal to the quantity of beams used by the base station to transmit SSBs in the window. Additionally, or alternatively, $Q_p$ may be defined to be greater than Q to indicate that one or more SSB beams will be transmitted multiple times to increase coverage (e.g., a combination of Q=4 and $Q_p$=8 may indicate that the base station will use four unique beams to transmit SSBs, and each unique beam will be transmitted twice). Additionally, or alternatively, $Q_p$ may correspond to a total quantity of candidate SSB positions in a maximum duration for the window. For example, in a cell with a 15 kHz subcarrier spacing, the window may correspond to a DRS window with a maximum duration of 5 ms, in which case $Q_p$ may equal 10 (e.g., the maximum quantity of candidate SSB positions that can fit in a DRS window with a 5 ms duration). In another example, in a cell with a 30 kHz subcarrier spacing, $Q_p$ may equal 20 in cases where $Q_p$ corresponds to the total quantity of candidate SSB positions in a maximum duration for the window. Additionally, or alternatively, $Q_p$ may correspond to a total quantity of candidate SSB positions in the window that is configured by the base station (e.g., in cases where a duration of the window in which SSB transmissions occur is shorter than the maximum).

Furthermore, in some aspects, $Q_m$ may be configured to be equal to Q (e.g., the quantity of beams used by the base station to transmit SSBs in the window). Additionally, or alternatively, $Q_m$ and $Q_p$ may be equal to each other. Additionally, or alternatively, $Q_m$ may be configured as a separate parameter independent from Q, $Q_p$, and/or the like. In general, however, $Q_p$ may be a multiple of $Q_m$ to ensure that repeating the SSB transmission pattern indicated by the first $Q_m$ bits in the bitmap over the first $Q_p$ SSB positions in the window accounts for all of the candidate SSB positions in which the UE is to perform rate matching within the initial portion of the window.

As further shown in FIG. 6A, and by reference number 620, the UE may selectively perform rate matching in the initial portion of the window based at least in part on the bitmap received from the base station, the parameter $Q_m$ that indicates the initial quantity of bits that defines the SSB transmission pattern, and the parameter $Q_p$ that indicates the quantity of initial candidate SSB positions in the window subject to rate matching. For example, FIG. 6A illustrates an example case in which the first 3 bits in the bitmap are set to '001,' $Q_m$=3, and $Q_p$=9. Accordingly, in example 600 as shown in FIG. 6A, the UE may selectively perform rate matching around every third candidate SSB position, starting with the third candidate SSB position with an SSB index of 2, and this SSB transmission pattern is repeated three times to cover the first $Q_p$ candidate SSB positions (e.g., the UE selectively performs rate matching in the third, sixth, and ninth candidate SSB positions).

Additionally, or alternatively, the bit sequence in the bitmap received from the base station may have a maximum bit length that is greater than or equal to a total quantity of candidate SSB positions in the window, which may allow the bitmap to indicate exactly which candidate SSB positions the UE is to rate match around. For example, the bitmap may include a 64-bit string for an ssb-PositionsInBurst parameter, or a separate parameter (e.g., ssb-PositionsInBurst-Unlicensed) with a quantity of bits that is based on the number of candidate SSB positions in the window. For example, in a cell with a 15 kHz subcarrier spacing, the bitmap may include at least 10 bits, and the first 10 bits of the bitmap may indicate whether an SSB is to be transmitted (such that the UE is to perform rate matching) in the corresponding candidate SSB position. In another example, where the cell has a 30 kHz subcarrier spacing, the bitmap may include at least 20 bits to enable the bitmap to specify whether an SSB is to be transmitted (such that the UE is to perform rate matching) in each candidate SSB position that occurs in the window. Accordingly, where the bitmap received from the base station has a maximum bit length greater than or equal to a total quantity of candidate SSB positions in the window, the initial portion of the window may cover the entire window (e.g., $Q_m=Q_p=$total quantity of candidate SSB positions in the window).

As shown in FIG. 6B, and by reference number 630, the base station may transmit, and the UE may receive, configuration information related to a PDSCH allocation in a later portion of the window. For example, as mentioned above, the initial portion of the window may cover the first $Q_p$ candidate SSB positions in the window, which in some cases may include fewer than the total quantity of candidate SSB positions in the window. In such cases, if the first $Q_p$ candidate SSB positions cover SSB indexes 0 through $Q_p-1$, the configuration information related to the PDSCH allocation in the later portion of the window may be provided to handle rate matching with respect to SSBs that are transmitted in candidate SSB positions with an SSB index greater than or equal to $Q_p$.

For example, in some aspects, the base station may configure a rate matching resource set that defines one or more rate matchable regions, which may cover one or more resource elements (REs) in which SSB transmissions may be performed. For example, in FIG. 6B, a PDSCH allocation in each slot after LBT success occurs may cover a certain frequency, and the rate matchable regions may include REs within the PDSCH allocation that can be used to transmit SSBs. In some aspects, the rate matchable regions may be signaled to the UE via RRC signaling, a cell broadcast, dedicated signaling when the UE is in connected mode, and/or the like. Furthermore, in some aspects, the configuration information related to the PDSCH allocation in the later portion of the window may include downlink control information (DCI) to indicate whether the UE is to perform rate matching in the rate matchable regions. For example, the DCI may include one or more rate matching bits that may signal whether the UE is to perform rate matching in one or more rate matchable regions depending on whether the base station is to transmit SSBs in the corresponding candidate SSB positions. In some aspects, the DCI used to indicate whether the UE is to perform rate matching in one or more rate matchable regions may be indicated via DCI format 1_1 or via DCI format 1_0, which are generally used to schedule a PDSCH in one cell. In the latter case, the PDSCH allocation may be signaled as non-remaining minimum system information (non-RMSI) to indicate that rate matching is to be performed around the corresponding candidate SSB position.

As further shown in FIG. 6B, and by reference number 640, the UE may selectively perform rate matching in the later portion of the window based on the configuration information related to the PDSCH allocation in the later portion of the window. For example, in cases where the configuration information includes DCI with one or more rate matching bits to indicate a rate matching pattern for SSBs transmitted in a candidate SSB position having an index greater than or equal to $Q_p$, one or more bits to indicate candidate SSB positions in which to perform rate matching, and/or the like, the UE may selectively perform rate matching around the candidate SSB position(s) indicated in the DCI. For example, as described above, the base station may preconfigure one or more rate matchable regions that include REs in which SSBs may be transmitted, and the UE may perform rate matching in the rate matchable regions if the DCI transmitted by the base station indicates that an SSB is to be transmitted in the corresponding candidate SSB position.

Additionally, or alternatively, rather than transmitting configuration information related to the PDSCH allocation in the later portion of the window and having the UE selectively perform rate matching, the base station may independently handle rate matching over the later portion of the window for candidate SSB positions having an SSB index greater than or equal to $Q_p$. For example, in FIG. 6B, the final slot in the window includes a PDSCH allocation in which the base station has allocated around the REs in which SSBs are to be transmitted (e.g., the PDSCH allocation does not include any time or frequency resources that collide with the REs in which SSBs are to be transmitted). In this way, the base station can determine a PDSCH allocation covering a region that overlaps the REs in which an SSB is to be transmitted such that, if the base station transmits an SSB in one or more candidate positions that are beyond the first $Q_p$ candidate positions in the window, the UE may not have to implement any rate matching logic in the later portion of the window because the base station appropriately handles rate matching or otherwise allocating around the candidate SSB position(s), if any, in which SSBs are transmitted in the later portion of the window.

As indicated above, FIGS. 6A-6B are provided as an example. Other examples may differ from what is described with respect to FIGS. 6A-6B.

FIG. 7 is a diagram illustrating an example process 700 performed, for example, by a UE, in accordance with various aspects of the present disclosure. Example process 700 is an example where the UE (e.g., UE 120 and/or the like) performs operations related to rate matching around SSBs in unlicensed spectrum.

As shown in FIG. 7, in some aspects, process 700 may include receiving, from a base station, a bitmap that includes a bit sequence to indicate an SSB transmission pattern (block 710). For example, the UE may receive (e.g., using antenna 252, DEMOD 254, MIMO detector 256, receive processor 258, controller/processor 280, and/or the like), from a base station, a bitmap that includes a bit sequence to indicate an SSB transmission pattern, as described above.

As further shown in FIG. 7, in some aspects, process 700 may include performing rate matching around one or more candidate SSB positions in an initial portion of a window in which SSB transmission is expected, based at least in part on the bitmap, a first parameter indicating a quantity of initial candidate SSB positions in the window that are subject to rate matching, and a second parameter indicating a quantity of initial bits in the bit sequence that define the SSB transmission pattern (block 720). For example, the UE may perform (e.g., using antenna 252, DEMOD 254, MIMO detector 256, receive processor 258, controller/processor 280, transmit processor 264, TX MIMO processor 266, MOD 254, antenna 252, and/or the like) rate matching around one or more candidate SSB positions in an initial portion of a window in which SSB transmission is expected, based at least in part on the bitmap, a first parameter indicating a quantity of initial candidate SSB positions in the window that are subject to rate matching, and a second parameter indicating a quantity of initial bits in the bit sequence that define the SSB transmission pattern, as described above.

Process 700 may include additional aspects, such as any single aspect or any combination of aspects described below and/or in connection with one or more other processes described elsewhere herein.

In a first aspect, one or more of the first parameter or the second parameter is equal to a quantity of beams used by the base station to transmit SSBs in the window.

In a second aspect, alone or in combination with the first aspect, the first parameter is equal to one or more of a total quantity of candidate SSB positions in the window or a total quantity of candidate SSB positions in a maximum duration for the window.

In a third aspect, alone or in combination with one or more of the first and second aspects, the first parameter has a value that is based at least in part on a subcarrier spacing used in a cell associated with the base station.

In a fourth aspect, alone or in combination with one or more of the first through third aspects, the SSB transmission pattern defined by the quantity of initial bits in the bit sequence repeats over the quantity of initial candidate SSB positions in the window that are subject to rate matching.

In a fifth aspect, alone or in combination with one or more of the first through fourth aspects, the bit sequence has a maximum bit length greater than or equal to a total quantity of candidate SSB positions in the window.

In a sixth aspect, alone or in combination with one or more of the first through fifth aspects, the bit sequence has a bit length that is based at least in part on a subcarrier spacing used in a cell associated with the base station.

In a seventh aspect, alone or in combination with one or more of the first through sixth aspects, process 700 includes receiving, from the base station, scheduling information including a resource allocation that avoids collisions with one or more SSB transmissions that occur after the quantity of initial candidate SSB positions indicated by the first parameter.

In an eighth aspect, alone or in combination with one or more of the first through seventh aspects, process 700 includes receiving, from the base station, downlink control information including one or more rate matching bits to indicate a rate matching pattern for one or more SSB transmissions scheduled to occur after the quantity of initial candidate SSB positions indicated by the first parameter, and performing rate matching around the one or more SSB transmissions scheduled to occur after the quantity of initial candidate SSB positions, based at least in part on the rate matching pattern indicated by the one or more rate matching bits.

In a ninth aspect, alone or in combination with one or more of the first through eighth aspects, process 700 includes receiving, from the base station, one or more bits in downlink control information to indicate one or more SSB positions in which to perform rate matching after the quantity of initial candidate SSB positions indicated by the first parameter, and performing rate matching around the one or more SSB positions indicated by the one or more bits in the downlink control information.

In a tenth aspect, alone or in combination with one or more of the first through ninth aspects, process 700 includes receiving, from the base station, signaling indicating the window in which the SSB transmission is expected.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
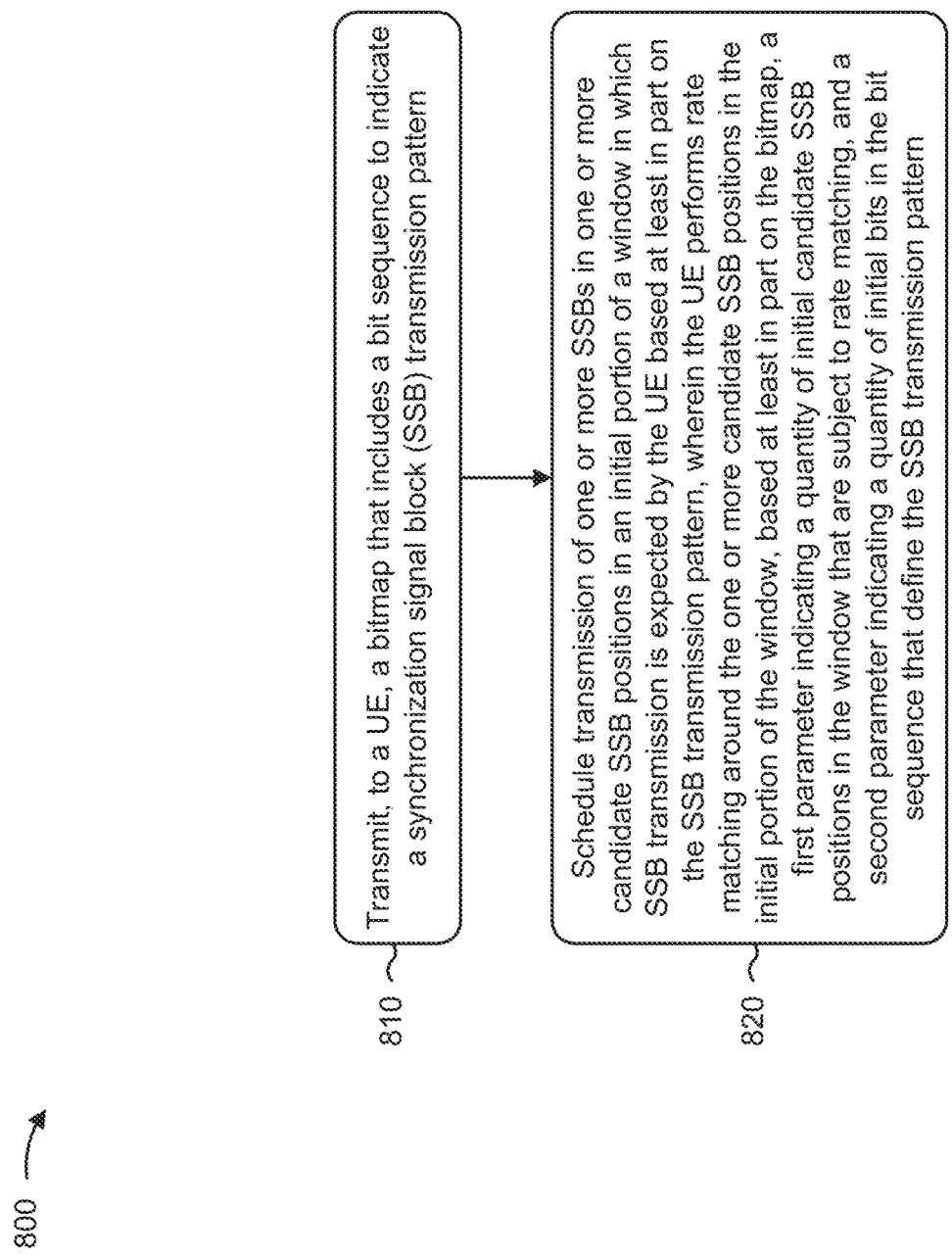
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., base station 110 and/or the like) performs operations related to rate matching around SSBs in unlicensed spectrum.

FIG. 8 is a diagram illustrating an example process 800 performed, for example, by a base station, in accordance with various aspects of the present disclosure. Example process 800 is an example where the base station (e.g., base station 110 and/or the like) performs operations associated with rate matching around synchronization signal blocks in unlicensed spectrum.

As shown in FIG. 8, in some aspects, process 800 may include transmitting, to a UE, a bitmap that includes a bit sequence to indicate an SSB transmission pattern (block 810). For example, the base station may transmit (e.g., using controller/processor 240, transmit processor 220, TX MIMO processor 230, MOD 232, antenna 234, and/or the like), to a UE, a bitmap that includes a bit sequence to indicate an SSB transmission pattern, as described above.

As further shown in FIG. 8, in some aspects, process 800 may include scheduling transmission of one or more SSBs in one or more candidate SSB positions in an initial portion of a window in which SSB transmission is expected by the UE based at least in part on the SSB transmission pattern, wherein the UE performs rate matching around the one or more candidate SSB positions in the initial portion of the window, based at least in part on the bitmap, a first parameter indicating a quantity of initial candidate SSB positions in the window that are subject to rate matching, and a second parameter indicating a quantity of initial bits in the bit sequence that define the SSB transmission pattern (block 820). For example, the base station may schedule (e.g., using controller/processor 240, transmit processor 220, TX MIMO processor 230, MOD 232, antenna 234, and/or the like) transmission of one or more SSBs in one or more candidate SSB positions in an initial portion of a window in which SSB transmission is expected by the UE based at least in part on the SSB transmission pattern, as described above. In some aspects, the UE performs rate matching around the one or more candidate SSB positions in the initial portion of the window, based at least in part on the bitmap, a first parameter indicating a quantity of initial candidate SSB positions in the window that are subject to rate matching, and a second parameter indicating a quantity of initial bits in the bit sequence that define the SSB transmission pattern.

Process 800 may include additional aspects, such as any single aspect or any combination of aspects described below and/or in connection with one or more other processes described elsewhere herein.

In a first aspect, one or more of the first parameter or the second parameter is equal to a quantity of beams used by the base station to transmit the one or more SSBs.

In a second aspect, alone or in combination with the first aspect, the first parameter is equal to one or more of a total quantity of candidate SSB positions in the window or a total quantity of candidate SSB positions in a maximum duration for the window.

In a third aspect, alone or in combination with one or more of the first and second aspects, the first parameter has a value that is based at least in part on a subcarrier spacing used in a cell associated with the base station.

In a fourth aspect, alone or in combination with one or more of the first through third aspects, the SSB transmission pattern defined by the quantity of initial bits in the bit sequence repeats over the quantity of initial candidate SSB positions in the window that are subject to rate matching.

In a fifth aspect, alone or in combination with one or more of the first through fourth aspects, the bit sequence has a maximum bit length greater than or equal to a total quantity of candidate SSB positions in the window.

In a sixth aspect, alone or in combination with one or more of the first through fifth aspects, the bit sequence has a bit length that is based at least in part on a subcarrier spacing used in a cell associated with the base station.

In a seventh aspect, alone or in combination with one or more of the first through sixth aspects, process 800 includes transmitting, to the UE, scheduling information including a resource allocation that avoids collisions with one or more SSB transmissions that occur after the quantity of initial candidate SSB positions indicated by the first parameter.

In an eighth aspect, alone or in combination with one or more of the first through seventh aspects, process 800 includes transmitting, to the UE, downlink control information including one or more rate matching bits to indicate a rate matching pattern for one or more SSB transmissions scheduled to occur after the quantity of initial candidate SSB positions indicated by the first parameter, and performing the one or more SSB transmissions according to the rate matching pattern indicated by the one or more rate matching bits, wherein the UE performs rate matching around the one or more SSB transmissions based at least in part on the rate matching pattern indicated by the one or more rate matching bits.

In a ninth aspect, alone or in combination with one or more of the first through eighth aspects, process 800 includes transmitting, to the UE, one or more bits in downlink control information to indicate one or more SSB positions in which to perform rate matching after the quantity of initial candidate SSB positions indicated by the first parameter, and performing one or more SSB transmissions in the one or more SSB positions indicated by the one or more bits in the downlink control information, wherein the UE performs rate matching around the one or more SSB positions based at least in part on the one or more bits in the downlink control information.

In a tenth aspect, alone or in combination with one or more of the first through ninth aspects, process 800 includes transmitting, to the UE, signaling indicating the window in which to expect the SSB transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, a bitmap that includes a bit sequence to indicate a synchronization signal block (SSB) transmission pattern; and
   performing rate matching around one or more candidate SSB positions in an initial portion of a window in which SSB transmission is expected, based at least in part on the bitmap, a first parameter indicating a quantity of initial candidate SSB positions in the window that are subject to rate matching, and a second parameter indicating a quantity of initial bits in the bit sequence that define the SSB transmission pattern.

2. The method of claim 1, wherein one or more of the first parameter or the second parameter is equal to a quantity of beams used by the base station to transmit SSBs in the window.

3. The method of claim 1, wherein the first parameter is equal to one or more of a total quantity of candidate SSB positions in the window or a total quantity of candidate SSB positions in a maximum duration for the window.

4. The method of claim 1, wherein one or more of a value of the first parameter or a bit length of the bit sequence is based at least in part on a subcarrier spacing used in a cell associated with the base station.

5. The method of claim 1, wherein the SSB transmission pattern defined by the quantity of initial bits in the bit sequence repeats over the quantity of initial candidate SSB positions in the window that are subject to rate matching.

6. The method of claim 1, wherein the bit sequence has a maximum bit length greater than or equal to a total quantity of candidate SSB positions in the window.

7. The method of claim 1, further comprising:
receiving, from the base station, scheduling information including a resource allocation that avoids collisions with one or more SSB transmissions that occur after the quantity of initial candidate SSB positions indicated by the first parameter.

8. The method of claim 1, further comprising:
receiving, from the base station, downlink control information including one or more rate matching bits to indicate a rate matching pattern for one or more SSB transmissions scheduled to occur after the quantity of initial candidate SSB positions indicated by the first parameter; and
performing rate matching around the one or more SSB transmissions scheduled to occur after the quantity of initial candidate SSB positions, based at least in part on the rate matching pattern indicated by the one or more rate matching bits.

9. The method of claim 1, further comprising:
receiving, from the base station, one or more bits in downlink control information to indicate one or more SSB positions in which to perform rate matching after the quantity of initial candidate SSB positions indicated by the first parameter; and
performing rate matching around the one or more SSB positions indicated by the one or more bits in the downlink control information.

10. The method of claim 1, further comprising:
receiving, from the base station, signaling indicating the window in which the SSB transmission is expected.

11. A method of wireless communication performed by a base station, comprising:
transmitting, to a user equipment (UE), a bitmap that includes a bit sequence to indicate a synchronization signal block (SSB) transmission pattern; and
scheduling transmission of one or more SSBs in one or more candidate SSB positions in an initial portion of a window in which SSB transmission is expected by the UE based at least in part on the SSB transmission pattern, wherein the UE performs rate matching around the one or more candidate SSB positions in the initial portion of the window, based at least in part on the bitmap, a first parameter indicating a quantity of initial candidate SSB positions in the window that are subject to rate matching, and a second parameter indicating a quantity of initial bits in the bit sequence that define the SSB transmission pattern.

12. The method of claim 11, wherein one or more of the first parameter or the second parameter is equal to a quantity of beams used by the base station to transmit the one or more SSBs.

13. The method of claim 11, wherein the first parameter is equal to one or more of a total quantity of candidate SSB positions in the window or a total quantity of candidate SSB positions in a maximum duration for the window.

14. The method of claim 11, wherein one or more of a value of the first parameter or a bit length of the bit sequence is based at least in part on a subcarrier spacing used in a cell associated with the base station.

15. The method of claim 11, wherein the SSB transmission pattern defined by the quantity of initial bits in the bit sequence repeats over the quantity of initial candidate SSB positions in the window that are subject to rate matching.

16. The method of claim 11, wherein the bit sequence has a maximum bit length greater than or equal to a total quantity of candidate SSB positions in the window.

17. The method of claim 11, further comprising:
transmitting, to the UE, scheduling information including a resource allocation that avoids collisions with one or more SSB transmissions that occur after the quantity of initial candidate SSB positions indicated by the first parameter.

18. The method of claim 11, further comprising:
transmitting, to the UE, downlink control information including one or more rate matching bits to indicate a rate matching pattern for one or more SSB transmissions scheduled to occur after the quantity of initial candidate SSB positions indicated by the first parameter; and
performing the one or more SSB transmissions according to the rate matching pattern indicated by the one or more rate matching bits, wherein the UE performs rate matching around the one or more SSB transmissions based at least in part on the rate matching pattern indicated by the one or more rate matching bits.

19. The method of claim 11, further comprising:
transmitting, to the UE, one or more bits in downlink control information to indicate one or more SSB positions in which to perform rate matching after the quantity of initial candidate SSB positions indicated by the first parameter; and
performing one or more SSB transmissions in the one or more SSB positions indicated by the one or more bits in the downlink control information, wherein the UE performs rate matching around the one or more SSB positions based at least in part on the one or more bits in the downlink control information.

20. The method of claim 11, further comprising:
transmitting, to the UE, signaling indicating the window in which to expect the SSB transmission.

21. A user equipment (UE) for wireless communication, comprising:
a memory; and
one or more processors operatively coupled to the memory, the memory and the one or more processors configured to:
receive, from a base station, a bitmap that includes a bit sequence to indicate a synchronization signal block (SSB) transmission pattern; and
perform rate matching around one or more candidate SSB positions in an initial portion of a window in which SSB transmission is expected, based at least in part on the bitmap, a first parameter indicating a quantity of initial candidate SSB positions in the window that are subject to rate matching, and a second parameter indicating a quantity of initial bits in the bit sequence that define the SSB transmission pattern.

22. The UE of claim 21, wherein one or more of the first parameter or the second parameter is equal to a quantity of beams used by the base station to transmit SSBs in the window.

23. The UE of claim 21, wherein the first parameter is equal to one or more of a total quantity of candidate SSB positions in the window or a total quantity of candidate SSB positions in a maximum duration for the window.

24. The UE of claim 21, wherein the memory and the one or more processors are further configured to:
receive, from the base station, downlink control information including one or more rate matching bits to indicate a rate matching pattern for one or more SSB transmissions scheduled to occur after the quantity of initial candidate SSB positions indicated by the first parameter; and
perform rate matching around the one or more SSB transmissions scheduled to occur after the quantity of initial candidate SSB positions, based at least in part on the rate matching pattern indicated by the one or more rate matching bits.

25. The UE of claim 21, wherein the memory and the one or more processors are further configured to:
receive, from the base station, one or more bits in downlink control information to indicate one or more SSB positions in which to perform rate matching after the quantity of initial candidate SSB positions indicated by the first parameter; and
perform rate matching around the one or more SSB positions indicated by the one or more bits in the downlink control information.

26. A base station for wireless communication, comprising:
a memory; and
one or more processors operatively coupled to the memory, the memory and the one or more processors configured to:
transmit, to a user equipment (UE), a bitmap that includes a bit sequence to indicate a synchronization signal block (SSB) transmission pattern; and
schedule transmission of one or more SSBs in one or more candidate SSB positions in an initial portion of a window in which SSB transmission is expected by the UE based at least in part on the SSB transmission pattern, wherein the UE performs rate matching around the one or more candidate SSB positions in the initial portion of the window, based at least in part on the bitmap, a first parameter indicating a quantity of initial candidate SSB positions in the window that are subject to rate matching, and a second parameter indicating a quantity of initial bits in the bit sequence that define the SSB transmission pattern.

27. The base station of claim 26, wherein one or more of the first parameter or the second parameter is equal to a quantity of beams used by the base station to transmit the one or more SSBs.

28. The base station of claim 26, wherein the first parameter is equal to one or more of a total quantity of candidate SSB positions in the window or a total quantity of candidate SSB positions in a maximum duration for the window.

29. The base station of claim 26, wherein the memory and the one or more processors are further configured to:
transmit, to the UE, downlink control information including one or more rate matching bits to indicate a rate matching pattern for one or more SSB transmissions scheduled to occur after the quantity of initial candidate SSB positions indicated by the first parameter; and
perform the one or more SSB transmissions according to the rate matching pattern indicated by the one or more rate matching bits, wherein the UE is to perform rate matching around the one or more SSB transmissions based at least in part on the rate matching pattern indicated by the one or more rate matching bits.

30. The base station of claim 26, wherein the memory and the one or more processors are further configured to:
transmit, to the UE, one or more bits in downlink control information to indicate one or more SSB positions in which to perform rate matching after the quantity of initial candidate SSB positions indicated by the first parameter; and
perform one or more SSB transmissions in the one or more SSB positions indicated by the one or more bits in the downlink control information, wherein the UE is to perform rate matching around the one or more SSB positions based at least in part on the one or more bits in the downlink control information.

* * * * *